(12) United States Patent
Narum et al.

(10) Patent No.: US 8,164,744 B2
(45) Date of Patent: Apr. 24, 2012

(54) INSPECTION TIP FOR A FIBER OPTIC INSPECTION PROBE

(75) Inventors: Mark D. Narum, Minnetonka, MN (US); Craig M. Standish, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 232 days.

(21) Appl. No.: 12/608,199

(22) Filed: Oct. 29, 2009

(65) Prior Publication Data

US 2010/0141934 A1    Jun. 10, 2010

Related U.S. Application Data

(60) Provisional application No. 61/109,698, filed on Oct. 30, 2008.

(51) Int. Cl.
*G01N 21/00* (2006.01)

(52) U.S. Cl. ....................................... 356/73.1

(58) Field of Classification Search ........................ None
See application file for complete search history.

(56) References Cited

U.S. PATENT DOCUMENTS

| | | | |
|---|---|---|---|
| 7,356,236 B1 * | 4/2008 | Huang et al. | 385/134 |
| 2004/0213537 A1 * | 10/2004 | Villeneuve | 385/134 |

OTHER PUBLICATIONS

Fiber Optic Probe Microscopes, *Westover Scientific*, 2 pages (Publicly known at least as early as Oct. 30, 2008).
FiberChek2 Probe, *Westover Scientific*, 3 pages (Nov. 9, 2006).
FiberChek2™ 2nd Generation Fiber End-face Inspection & Analysis User Manual, *Westover Scientific*, 53 pages (Copyright 2007).
OmniReach® FTTX Solutions DLX™ Fiber Optic Connector Spec Sheet, *ADC Telecommunications, Inc.*, 8 pages (Sep. 2008).

* cited by examiner

*Primary Examiner* — Tu Nguyen

(74) *Attorney, Agent, or Firm* — Merchant & Gould P.C.

(57) ABSTRACT

An inspection probe is disclosed for use with a fiber optic adapter. The inspection probe can inspect a terminated end of an optical fiber within the fiber optic adapter. The fiber optic adapter can include a ferrule receiver located between first and second ports. The inspection probe is inserted into the first port of the fiber optic adapter and a coupling feature of the inspection probe engages and aligns with the ferrule receiver. A fiber optic connector is inserted into the second port of the fiber optic adapter and a ferrule of the fiber optic connector aligns with the ferrule receiver. The ferrule holds the terminated end of the optical fiber and thereby positions the terminated end within the ferrule receiver. An image capturing end of the inspection probe is thereby positioned proximal the terminated end of the optical fiber and can inspect the terminated end and/or the ferrule.

11 Claims, 8 Drawing Sheets

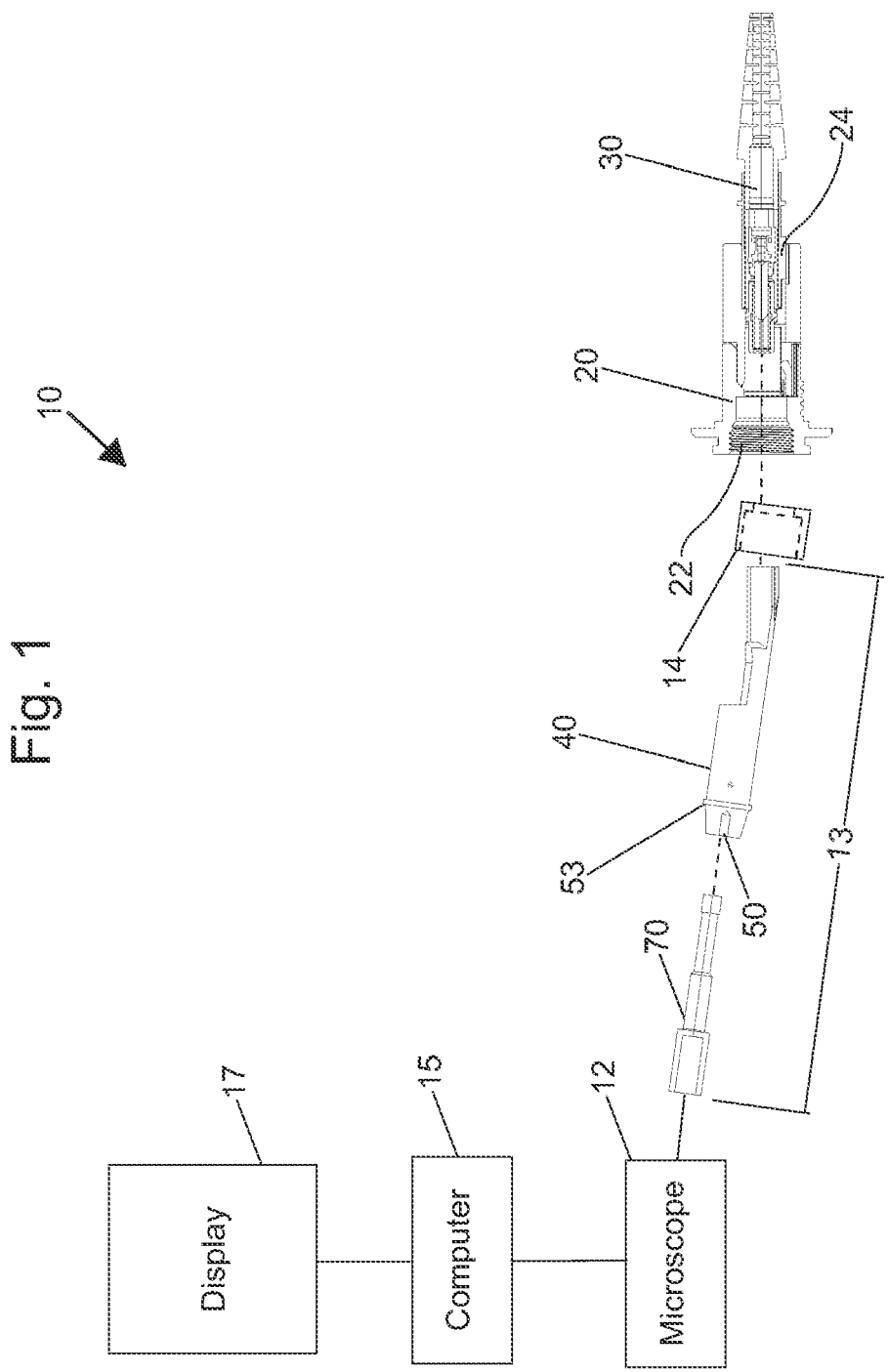

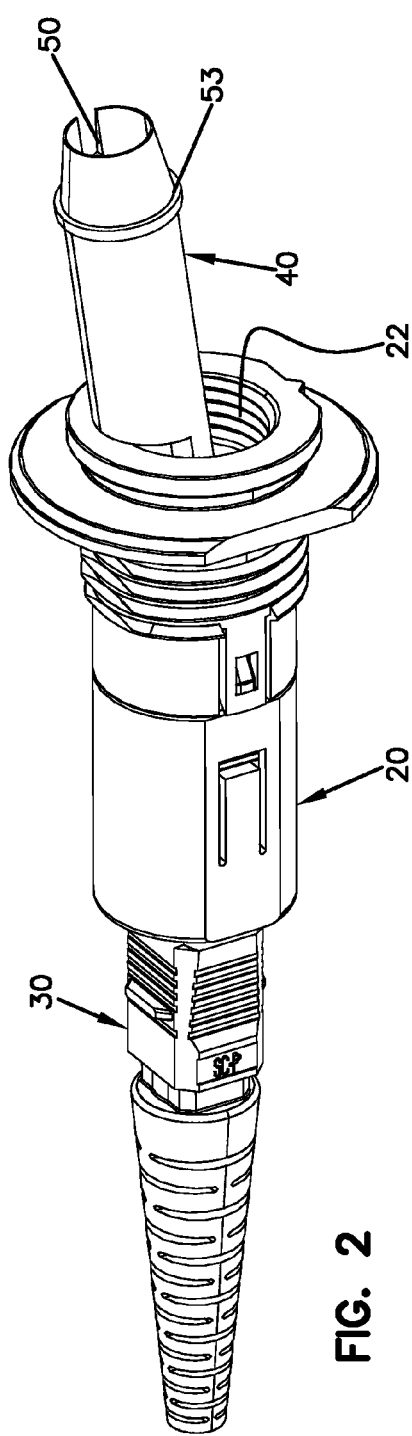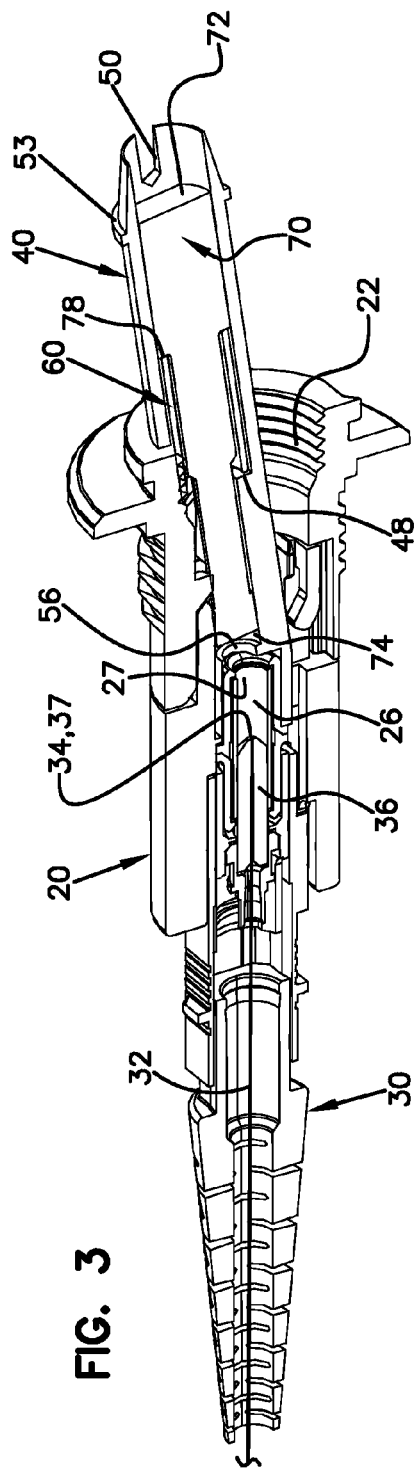

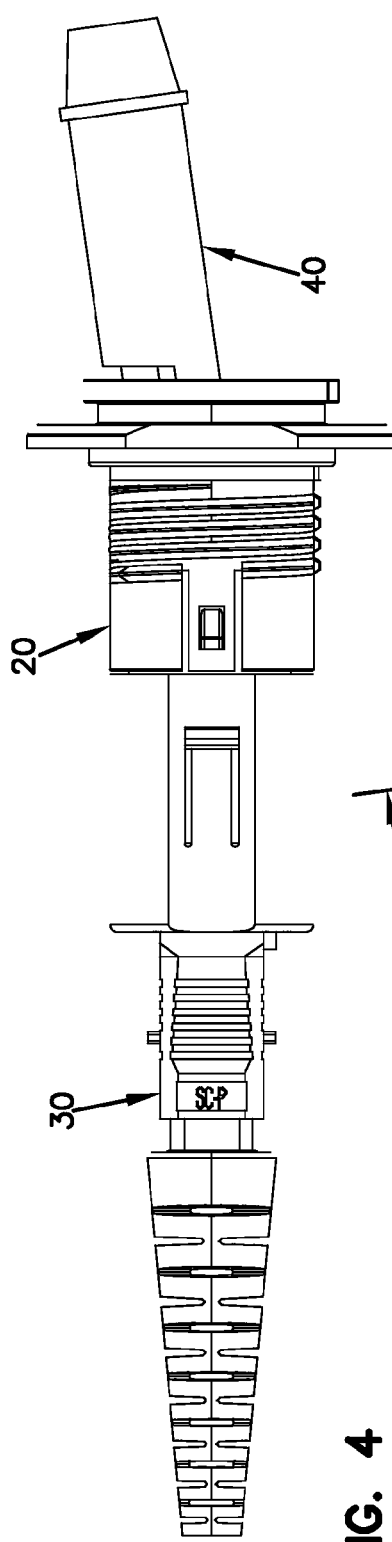
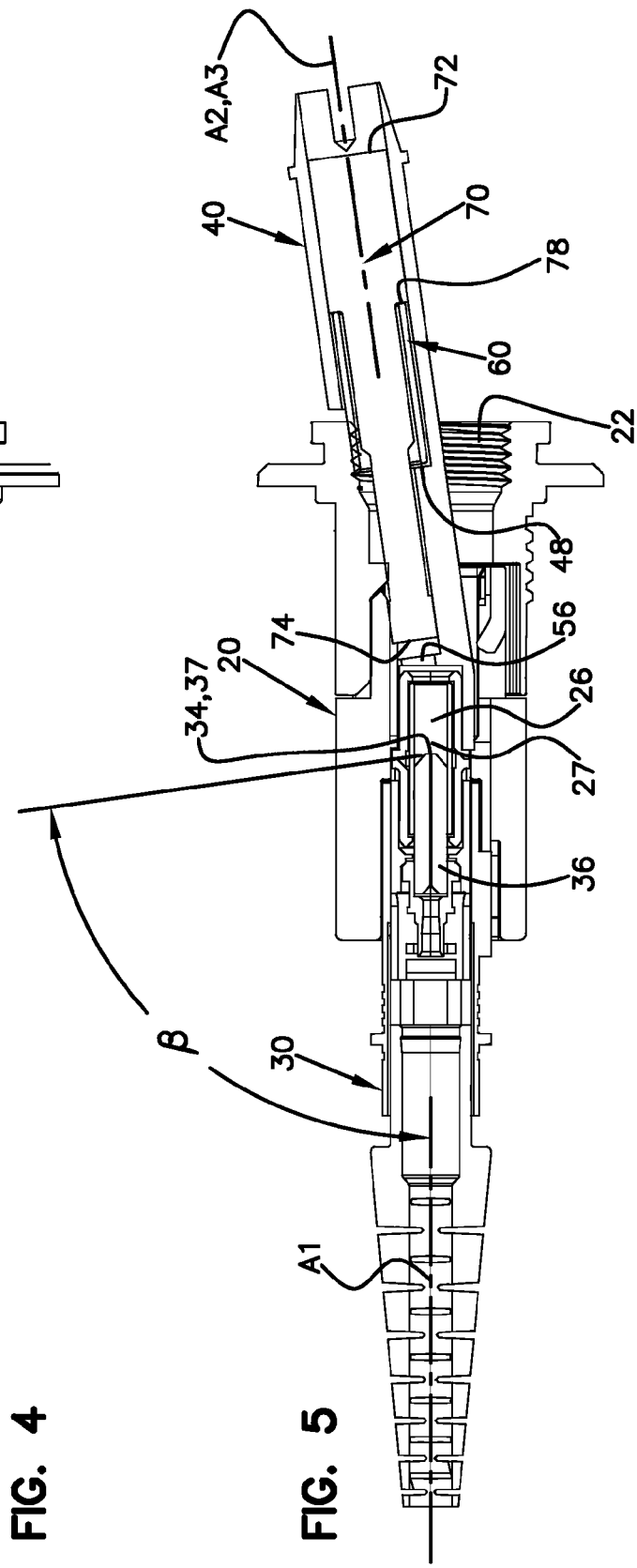
FIG. 4
FIG. 5

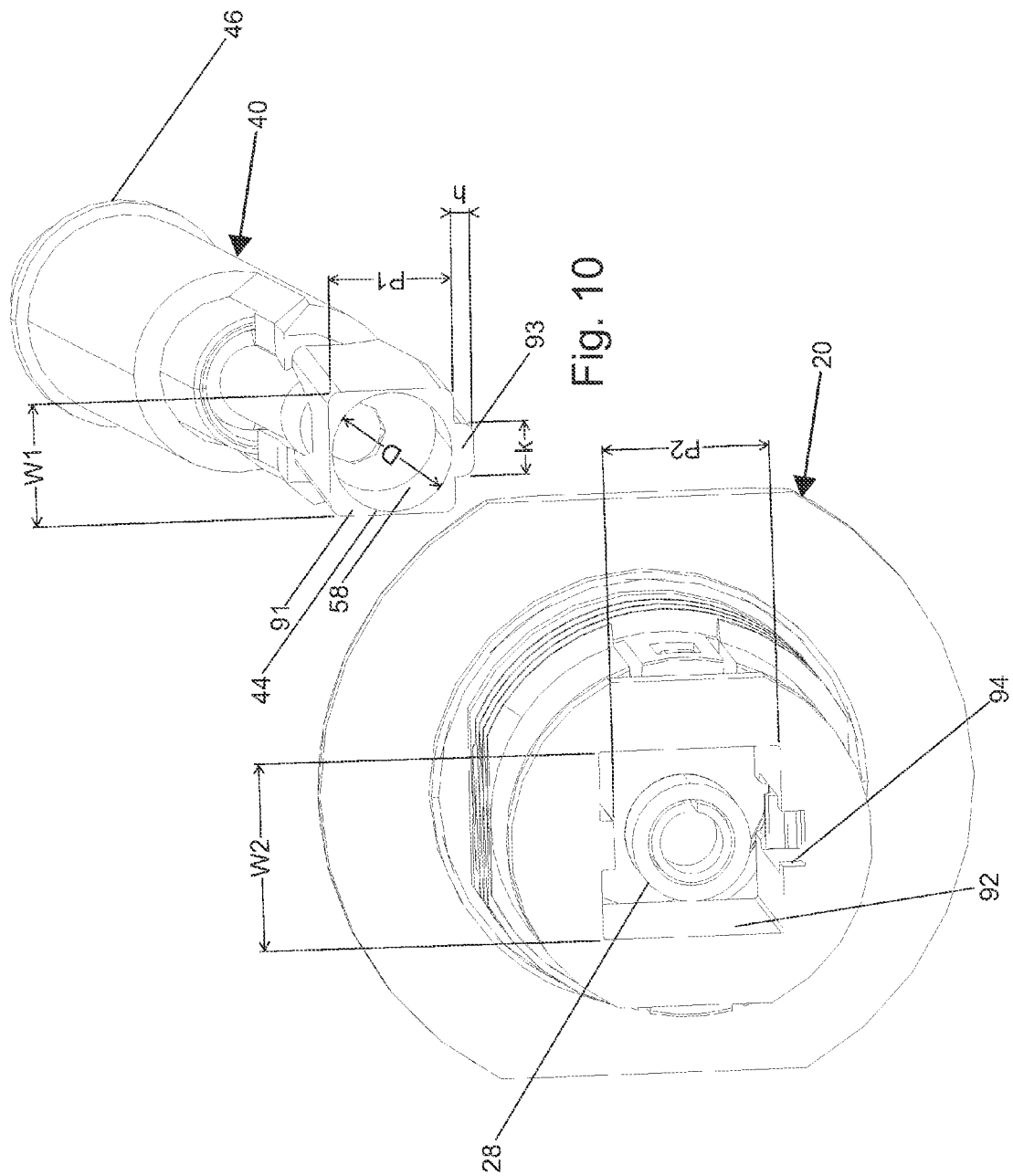

INSPECTION TIP FOR A FIBER OPTIC INSPECTION PROBE

CROSS REFERENCE TO RELATED APPLICATION

The present application claims the benefit of U.S. Provisional Patent Application Ser. No. 61/109,698, filed Oct. 30, 2008, which application is hereby incorporated by reference in its entirety.

TECHNICAL FIELD

The present disclosure relates to fiber optic data transmission and to fiber optic cable connection systems. In particular, the present disclosure relates to inspecting such fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that terminate and support the ends of the optical fibers of the fiber optic cables. The ferrules typically include one or more bores that extend along their length. The optical fiber or the optical fibers are typically inserted through the one or more bores of the ferrule and bonded to the ferrule. An excess length of the optical fiber can extend beyond an end face of the ferrule when the optical fiber is bonded to the ferrule. The excess length of the optical fiber can then be trimmed off and polished. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

Systems have been developed that use a microscope to inspect the end face of a fiber terminated at a fiber optic connector. Example inspection systems are disclosed at U.S. Pat. Nos. 6,717,017 and 6,879,436.

SUMMARY

The present disclosure relates to an inspection tip (i.e., an inspection probe holder) that receives/houses an inspection probe. In use, the inspection probe cooperates with a microscope that generates a visual image of an end face of a fiber terminated at a fiber optic component. The inspection tip protects the inspection probe and provides a mechanical interface with the fiber optic component. In certain embodiments, the inspection tip can include a coupling feature for mechanically coupling the inspection tip to the fiber optic component. The coupling feature can define an axis aligned at an oblique angle relative to a microscope inspection axis. In certain embodiments, the mechanical interface between the inspection tip and the fiber optic component can include a key that fits within a corresponding keyway. In certain embodiments, the inspection tip can include a cut-away region that provides clearance for inserting the inspection tip within the fiber optic component.

The present disclosure also relates to an inspection tip for a probe microscope, the inspection tip being used to facilitate inspecting a ferrule of a fiber optic connector while the fiber optic connector is mounted within a fiber optic adapter. The inspection tip includes a tip body having a proximal end and an opposite distal end. The proximal end is adapted for connection to the probe microscope and the distal end is adapted for insertion within the fiber optic adapter. The tip body defines a passage that extends from the proximal end to the distal end of the tip body. A proximal end of the passage is positioned at the proximal end of the tip body, and a distal end of the passage is positioned at the distal end of the tip body. The passage includes a proximal portion and a distal portion that meet at an intermediate location. The proximal portion extends from the proximal end of the passage to the intermediate location and the distal portion extends from the distal end of the passage to the intermediate location. The proximal portion of the passage defines a first axis that aligns with a microscope inspection axis, and the distal portion of the passage defines a coupling feature that receives an end of a split sleeve holder of the fiber optic adapter. The distal portion of the passage defines a second axis that aligns with a central axis of the ferrule of the fiber optic connector when the end of the split sleeve holder is received in the coupling feature. The second axis intersects the first axis at an oblique angle. The distal end of the tip body includes an alignment key that rotationally aligns the tip body within the fiber optic adapter. The distal end of the tip body also includes a cut-away region positioned opposite from the alignment key that provides clearance for allowing the distal end of the tip body to be inserted into the fiber optic adapter.

BRIEF DESCRIPTION OF THE DRAWINGS

FIG. 1 is a schematic view of an inspection system in accordance with the principles of the present disclosure;

FIG. 2 is a perspective view of a fiber optic adapter with a fiber optic connector inserted in a first port and a tip and probe assembly inserted in a second port of the fiber optic adapter;

FIG. 3 is the perspective view of FIG. 2 but with a vertical cross-section taken through a central axis of the fiber optic adapter and through a central axis of the tip and probe assembly;

FIG. 4 is an elevation view of the fiber optic adapter, the fiber optic connector, and the tip and probe assembly of FIG. 2;

FIG. 5 is the elevation view of FIG. 4 but with a vertical cross-section taken through the central axis of the fiber optic adapter and through the central axis of the tip and probe assembly;

FIG. 10 is a perspective cross-sectional view showing the mechanical interface between the tip and the fiber optic adapter of FIG. 2.

DETAILED DESCRIPTION

Figure 6:
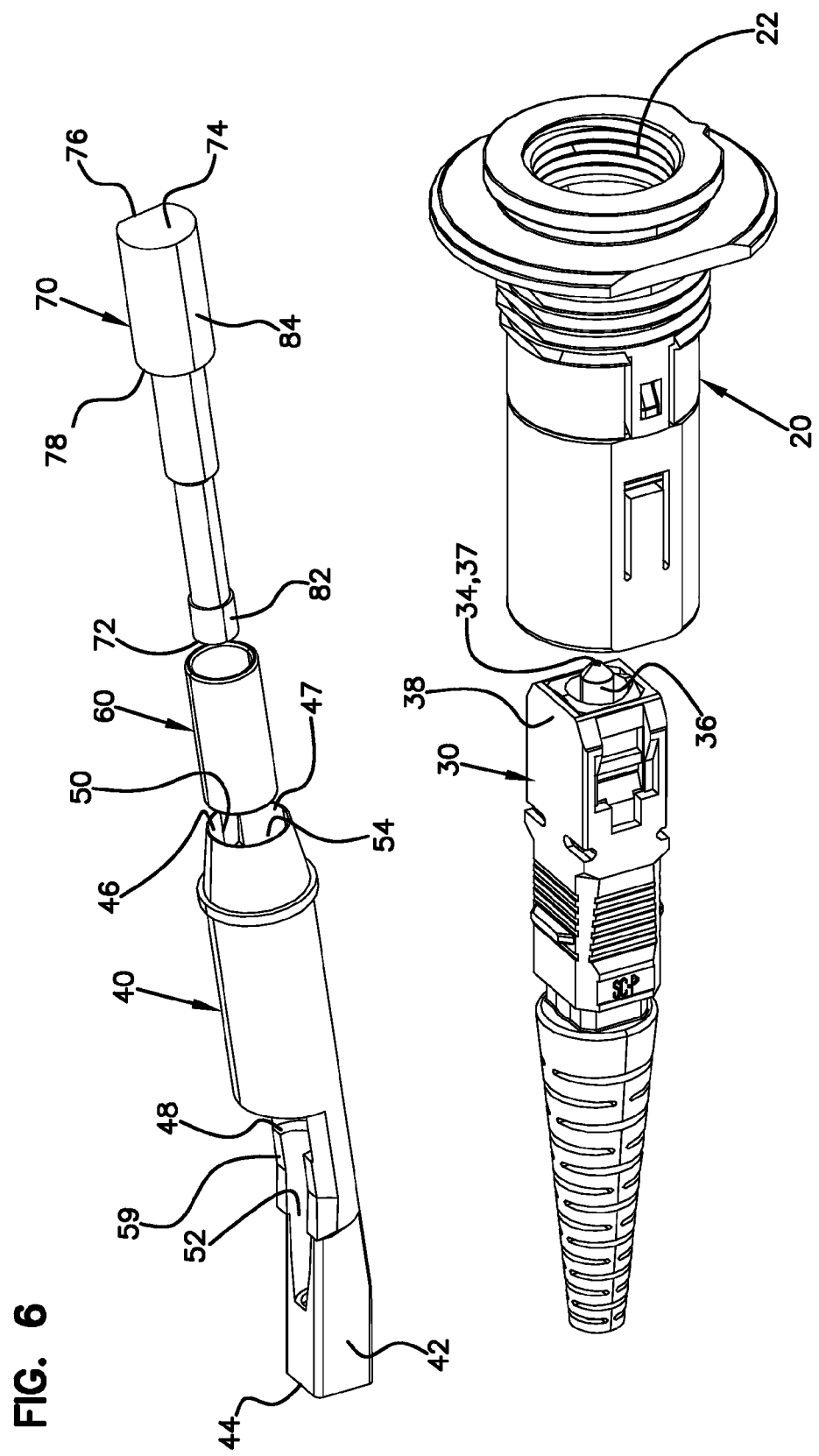
FIG. 6 is an exploded perspective view of the fiber optic adapter, the fiber optic connector, and the tip and probe assembly of FIG. 2.
Figure 7:
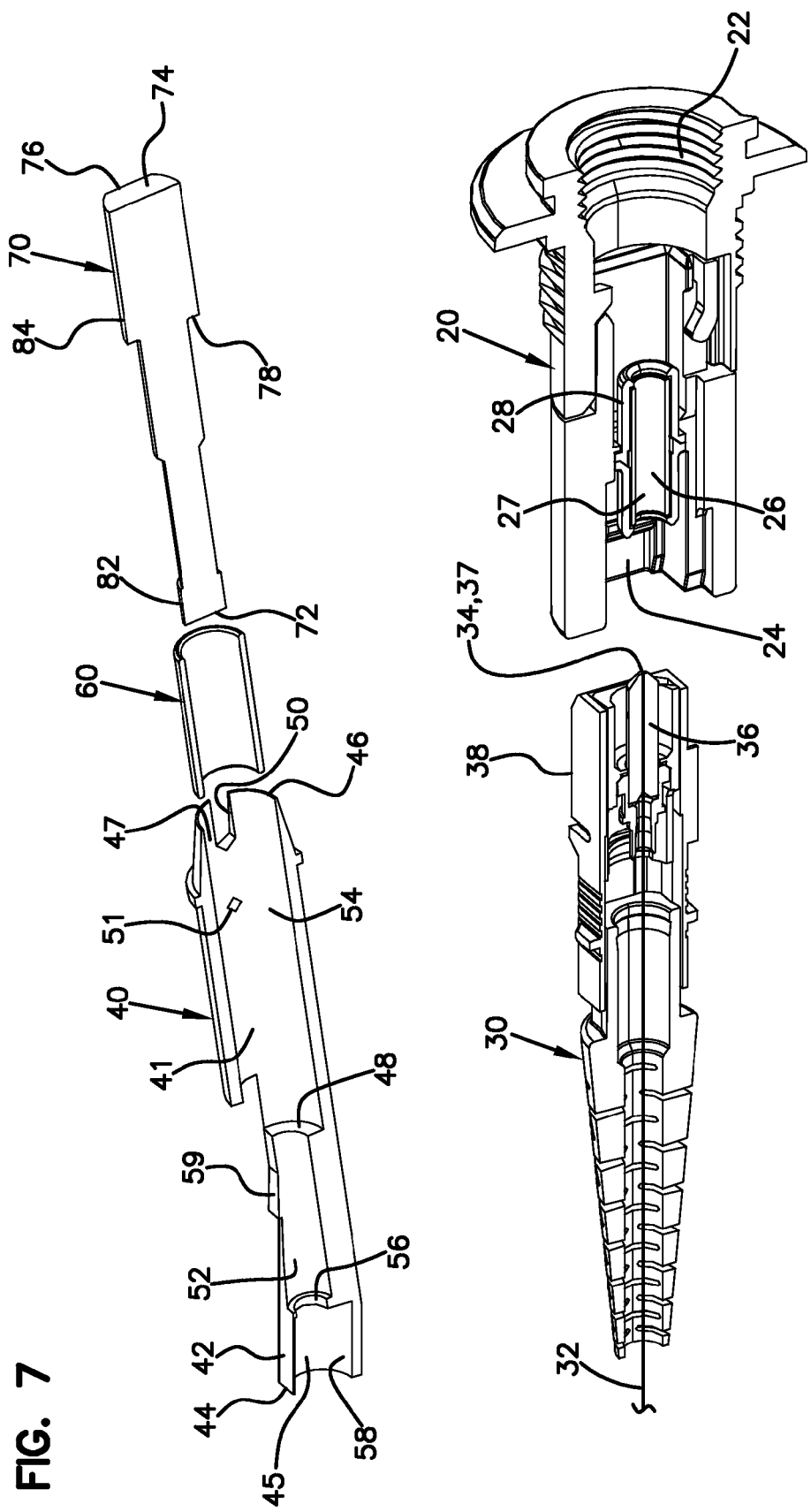
FIG. 7 is the exploded perspective view of FIG. 6 but with a vertical cross-section taken through the central axis of the fiber optic adapter and through the central axis of the tip and probe assembly.

The present disclosure relates to inspecting terminated ends of optical fibers and ferrules terminating the optical fibers. Inspecting the terminated ends of the optical fibers and an end face of the ferrule associated with the terminated end can aid in troubleshooting a fiber optic network and/or a fiber optic connection. Such inspections can also be preformed for quality control purposes. The terminated end of the optical fiber and/or the end face of the ferrule can be inspected in different environments and surrounds.

The present disclosure also relates to a process for inspecting the terminated end of the optical fiber and/or the end face of the ferrule within a fiber optic adapter. The ferrule and the optical fiber can be optically inspected through a first port of the fiber optic adapter. The ferrule and the optical fiber can be part of a fiber optic connector terminating a fiber optic cable. The fiber optic connector can be connected to a second port of the fiber optic adapter. The fiber optic adapter can further be installed at an opening of a junction box (e.g., a multi-port fiber terminal) at the time of inspection.

Inspecting the optical fiber and the ferrule within the fiber optic adapter provides convenience and consistency to the inspection process. The fiber optic connector preferably remains connected to the fiber optic adapter during the inspection process thus avoiding the need to disconnect the fiber optic connector and/or open the junction box. The fiber optic adapter securely holds the ferrule and thereby the optical fiber and provides consistent and sturdy guiding features to inspection hardware.

FIG. 1 shows an example inspection system 10 in accordance with the principles of the present disclosure. The system 10 is adapted for visually inspecting a ferrule end face and/or a fiber end face of a fiber optic connector 30 while the fiber optic connector 30 is mounted within a fiber optic adapter 20. The fiber optic adapter 20 includes a first port 22 positioned opposite from a second port 24. The fiber optic connector 30 is mounted in the second port 24. The system 10 includes an image generator such as a microscope 12 (e.g., a digital inspection probe microscope), and a tip and probe assembly 13 that attaches to the microscope 12 (e.g., via a coupling nut 14). An example microscope is the FBP-P5000 Digital Probe Microscope sold by Westover Scientific, Inc. of Mill Creek, Wash. USA. The tip and probe assembly 13 includes an inspection probe 70 that can incorporate a lens, an optical fiber, or other optical components that assist in conveying an optical image to the microscope 12. In certain embodiments, the optical image is conveyed through the tip and probe assembly 13 to the microscope 12 without the use of mirrors. The tip and probe assembly 13 also includes an inspection tip 40 (i.e., an inspection probe holder) that houses the inspection probe 70 and that provides a mechanical interface with the fiber optic adapter 20 that ensures proper alignment between the fiber optic connector 30 and the inspection probe 70 during inspection. The inspection system 10 also includes a processing unit 15 (e.g., a computer such as a laptop computer) and a visual display 17.

In use, the tip and probe assembly 13 is initially attached to the microscope 12. Thereafter, the tip and probe assembly 13 is inserted into the first port 22 of the fiber optic adapter 20 and mechanically coupled/linked to the fiber optic adapter 20. The microscope 12 then, via the probe 70, creates an optical image or optical images of the connector fiber/ferrule end faces. The microscope 12 can include a processor which converts the collected images into signals (e.g., electric signals, digital electric signals, optical signals, etc.). The signals can be further processed, collected, stored, and/or analyzed by the computer 15. Still or video images of the fiber/ferrule end faces can be displayed on the display 17. By showing the images on the display 17, an operator visually inspect the fiber/ferrule end faces to make sure they are acceptable (e.g., not contaminated, damaged or covered with debris). In certain embodiments, software can be used to determine if the fiber/ferrule end faces meet predetermined inspection parameters.

FIGS. 2-10 depict the fiber optic connector 30, the fiber optic adapter 20, the example inspection probe 70, and the inspection probe holder 40. In certain embodiments of the present disclosure, including embodiments depicted at FIGS. 2-10, the fiber optic adapter 20 is a DLX™ Fiber Optic Adapter. The DLX™ Fiber Optic Adapter is manufactured and marketed by ADC Telecommunications of Eden Prairie Minn., USA. Certain aspects of the DLX™ Fiber Optic Adapter are disclosed at U.S. Provisional Patent Application Ser. No. 61/007,222, filed Dec. 11, 2007; U.S. Provisional Patent Application Ser. No. 61/029,524, filed Feb. 18, 2008; U.S. patent application Ser. No. 12/203,508, entitled "Hardened Fiber Optic Connector Compatible with Hardened and Non-Hardened Fiber Optic Adapters", filed Sep. 3, 2008 and now U.S. Pat. No. 7,744,288; U.S. patent application Ser. No. 12/203,522, entitled "Hardened Fiber Optic Connection System", filed Sep. 3, 2008 and now U.S. Pat. No. 7,762,726; U.S. patent application Ser. No. 12/203,530, entitled "Hardened Fiber Optic Connection System with Multiple Configurations", filed Sep. 3, 2008 and now U.S. Pat. No. 7,744,286; and U.S. patent application Ser. No. 12/203,535, entitled "Hardened Fiber Optic Connector and Cable Assembly with Multiple Configurations", filed Sep. 3, 2008 and now U.S. Pat. No. 7,942,590; which applications are incorporated herein by reference in their entirety.

Referring to FIGS. 2-10, the fiber optic adapter 20 includes a ferrule receiver 26 (e.g., a split-sleeve) positioned between and accessible from the first and the second ports 22, 24. When the fiber optic adapter 20 is used to connect the fiber optic connector 30 to another fiber optic connector, the fiber optic connector 30 is connected to the second port 24 and the other fiber optic connector is connected to the first port 22. An interior ferrule holding surface 27 of the ferrule receiver 26 coaxially aligns a ferrule 36 of the fiber optic connector 30 with another ferrule of the other fiber optic connector. The interior ferrule holding surface 27 defines a central longitudinal axis A1 of the fiber optic adapter 20 (see FIGS. 5 and 8). The ferrule receiver 26 is mounted within a holder (e.g., a split-sleeve holder) that includes a locating surface 28 (e.g., an outer diameter, an outward facing surface, an outer surface, etc.) that is accessible from the first port 22 of the fiber optic adapter 20.

Referring still to FIGS. 2-10, the fiber optic connector 30 includes an optical fiber 32 having a terminated end 34 held by a ferrule 36. The ferrule 36 includes a bore that extends along its length. The optical fiber 32 is inserted through the bore of the ferrule 36 and can be bonded to the ferrule 36. An excess length of the optical fiber 32 can extend beyond an end face 37 of the ferrule 36 when the optical fiber 32 is bonded to the ferrule 36. The excess length of the optical fiber 32 can then be trimmed off to the end face 37 of the ferrule 36 and polished thereby finishing the terminated end 34 of the optical fiber 32. In the example embodiment, the optical fiber 32 generally lies along the central longitudinal axis A1 of the interior ferrule holding surface 27 of the ferrule receiver 26 when the fiber optic connector 30 is connected to the fiber optic adapter 20. In preferred embodiments, the fiber optic connector 30 includes a plug portion 38 that engages the second port 24 of the fiber optic adapter 20.

The end face 37 of the ferrule 36 and/or the terminated end 34 of the optical fiber 32 can be angled by an angle $\beta$ from the central longitudinal axis A1 (see FIG. 5). In certain embodiments, the angle $\beta$ can be about 82 degrees. In other embodiments, the angle $\beta$ ranges between 86 degrees and 78 degrees. In still other embodiments, the angle $\beta$ ranges between 84 degrees and 80 degrees. In yet other embodiments, the angle $\beta$ ranges between 83 degrees and 81 degrees.

The inspection probe 70 includes a first end 72 and a second end 74. A keying feature 76 can be included on the inspection probe 70 to orient the inspection probe 70. The inspection probe 70 preferably includes a cylindrical outer surface 82 near or at the first end 72 and a cylindrical outer surface 84 near or at the second end 74. The cylindrical outer surfaces 82, 84 are preferably coaxial with each other and define an axis A3 (i.e., a microscope inspection/viewing axis) of the inspection probe 70. In the depicted embodiment, the keying feature 76 is located on the cylindrical outer surface 84 and orients the inspection probe 70 about the axis A3. A shoulder 78 can be included on the inspection probe 70.

The inspection probe holder 40 includes a first end 44 (e.g., a distal end) and a second end 46 (e.g., a proximal end). A passage 41 extends between the first and the second ends 44, 46 and includes a first opening 45 at the first end 44 and a second opening 47 at the second end 46. A keying feature 51, a small bore 52, and/or a large bore 54 can be included within the passage 41. The large bore 54 can be positioned at the second end 46 of the inspection probe holder 40. A shoulder 48 can be positioned between the small and the large bores 52, 54. The passage 41 can further include an opening 56 connecting the small bore 52 with a coupling feature 58 positioned at the first end 44 of the inspection probe holder 40. The inspection probe holder 40 can further include a plug portion 42 at the first end 44 and a keying feature 50 (i.e., an alignment feature) at the second end 46. A cutaway 59 (i.e., a notch) can break through to the small bore 52 and/or the large bore 54 from an exterior of the inspection probe holder 40.

Figure 9:
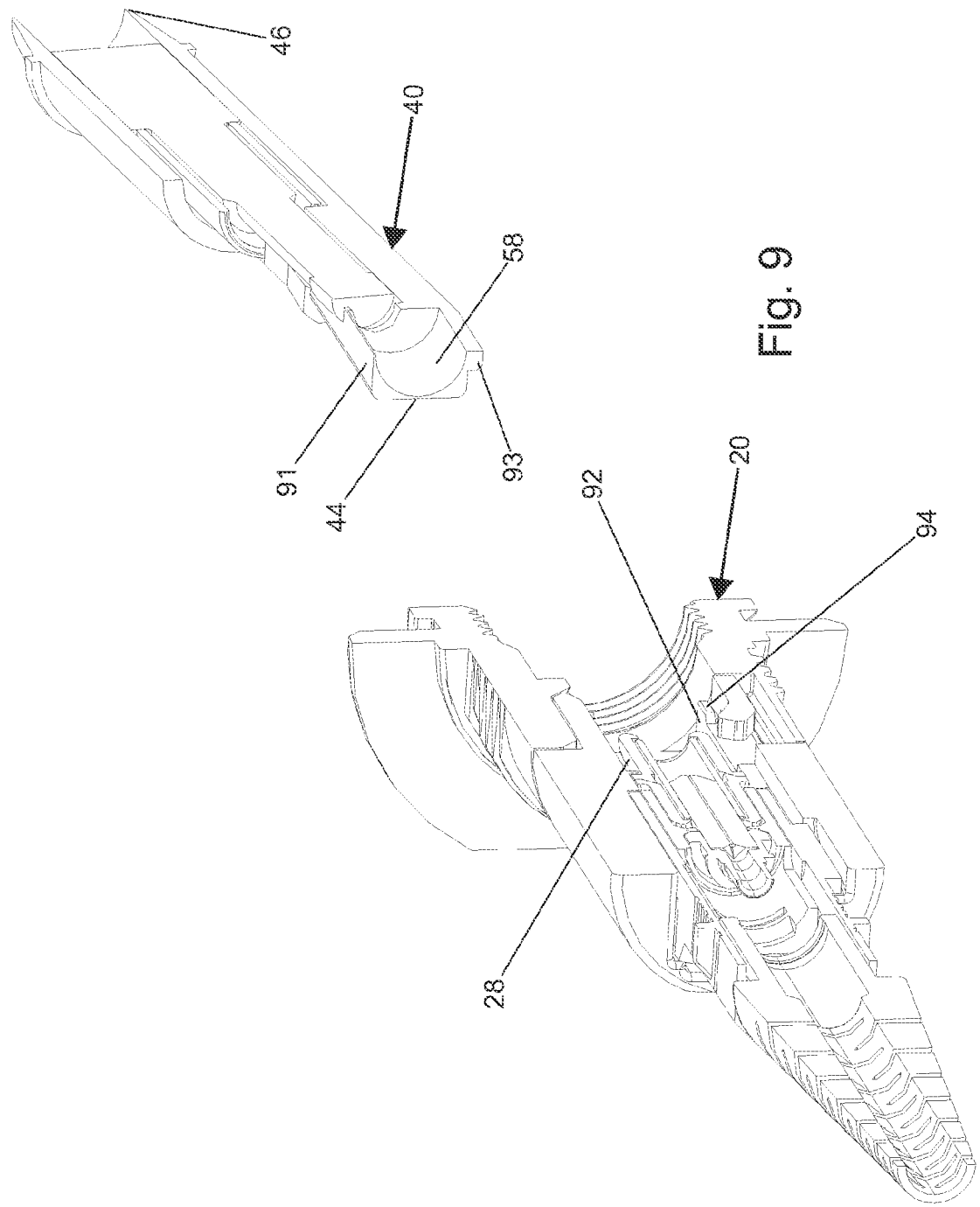
FIG. 9 is a perspective cross-sectional view showing the tip and probe assembly aligned with the fiber optic adapter of FIG. 2.

The second end 46 of the inspection probe holder 40 is adapted for mechanical connection to the microscope 12. For example, the second end 46 includes a flange 53 that engages the coupling nut 14 when the tip and probe assembly 13 is secured to the microscope 12, and the alignment feature 50 receives a corresponding key of the microscope 12 to ensure rotational alignment between the inspection probe holder 40 and the microscope 12. The first end 44 of the inspection probe holder is adapted provide a mating mechanical interface with a portion of the fiber optic adapter 20. For example, as shown at FIGS. 9 and 10, the first end 44 defines a generally rectangular extension 91 sized to fit within a corresponding rectangular receptacle 92 defined by the fiber optic adapter 20. The extension 91 defines dimensions W1 and P1 that are respectively slightly smaller than corresponding dimensions W2 and P2 defined by the receptacle 92 of the fiber optic adapter 20. In one embodiment, W1 and P1 are each about 0.196 inches. The extension 91 also includes a key 93 that projects outwardly from one of the sides of the extension 91 and that fits within a corresponding keyway 94 provided at the receptacle 92. In one embodiment, the key 93 has a dimension k of about 0.084 inches and a dimension h of about 0.03 inches. The coupling feature 58 of the probe holder 40 defines a circular receptacle having a diameter D sized for receiving an end of the split sleeve holder of the adapter 20. The locating surface 28 of the fiber optic adapter 20 defines an outer diameter of the split sleeve holder that is slightly smaller than the diameter D of the coupling feature 58. In one embodiment, the diameter D is about 0.188 inches.

In preferred embodiments, the coupling feature 58 defines an axis A4 that is coaxial with the central longitudinal axis A1 of the interior ferrule holding surface 27 of the fiber optic adapter 20 when the inspection probe holder 40 is fully inserted into the fiber optic adapter 20. The passage 41 of the inspection probe holder 40 preferably defines an axis A2 and the axis A3 of the inspection probe 70 is aligned with the axis A2 when the inspection probe 70 is inserted into the passage 41 (see FIGS. 5 and 8). In preferred embodiments, the small bore 52 and the large bore 54 of the passage 41 are coaxial with each other and define the axis A2.

Figure 8:
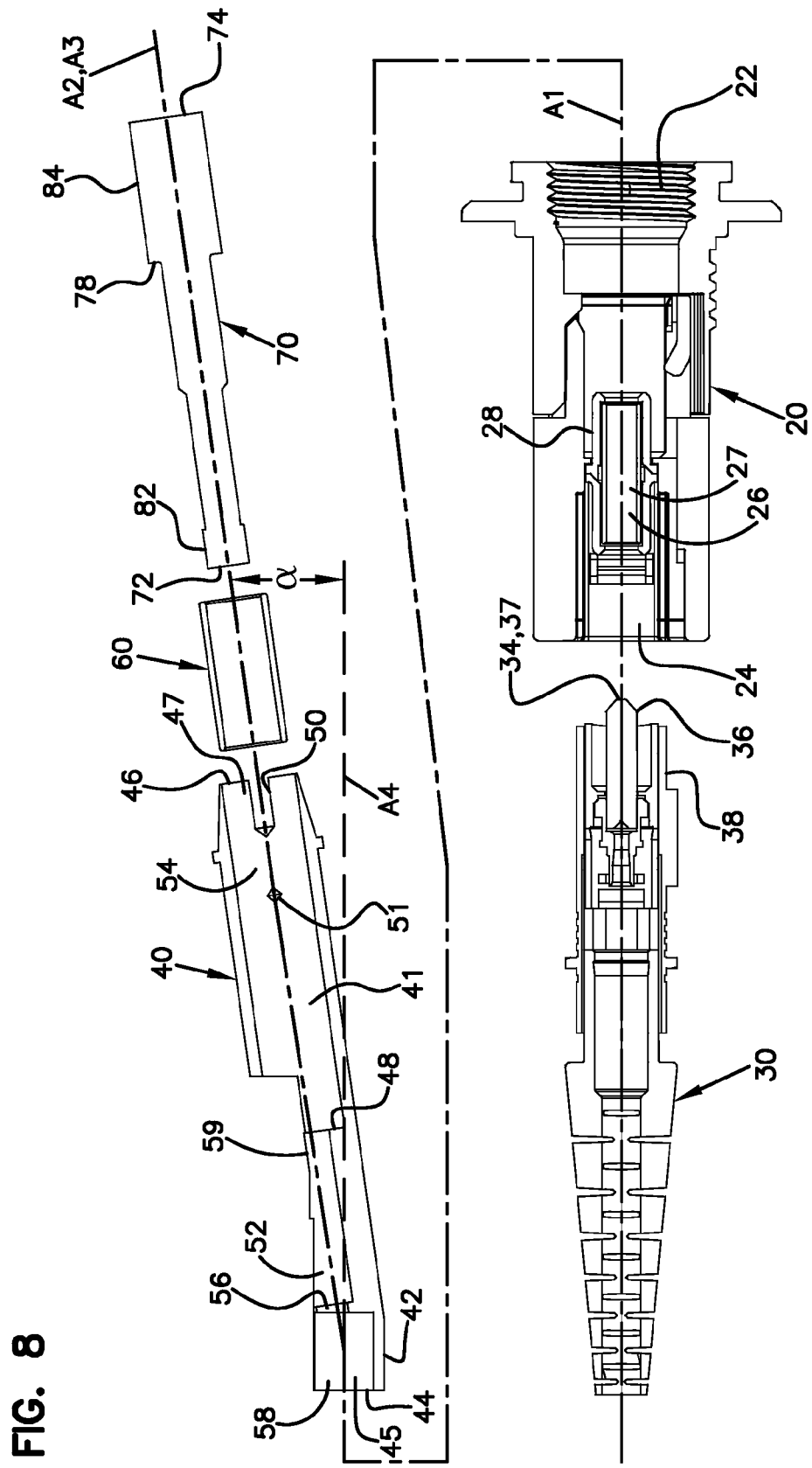
FIG. 8 is an exploded elevation view of the fiber optic adapter, the fiber optic connector, and the tip and probe assembly of FIG. 2 with a vertical cross-section taken through the central axis of the fiber optic adapter and through the central axis of the tip and probe assembly.

In certain embodiments, the axis A4 of the coupling feature 58 is angled at an angle $\alpha$ from the axis A2 of the passage 41 (see FIG. 8). In certain embodiments, the angle $\alpha$ is about 8 degrees. In other embodiments, the angle $\alpha$ ranges between 6 degrees and 10 degrees.

In preferred embodiments, the cylindrical outer surface 82 of the inspection probe 70 slidingly engages the small bore 52 of the inspection probe holder 40 and the cylindrical outer surface 84 slidingly engages the large bore 54 when the inspection probe 70 is inserted into the passage 41 of the inspection probe holder 40.

The axis A2 of the passage 41 of the inspection probe holder 40 is thereby aligned with the axis A3 of the inspection probe 70. The keying feature 76 of the inspection probe 70 can engage the keying feature 51 of the inspection probe holder 40 to rotationally orient the inspection probe 70 and the inspection probe holder 40 about the axes A2, A3. An elastic element 60 (e.g., a spring, a coil spring, a compression spring, etc.) can be positioned between the shoulder 48 of the inspection probe holder 40 and the shoulder 78 of the inspection probe 70 to bias the inspection probe 70 outwardly from the passage 41 of the inspection probe holder 40 in a direction opposite a direction of insertion along the axis A2 of the passage 41.

To inspect the terminated end 34 of the optical fiber 32 and/or the end face 37 of the ferrule 36, the fiber optic connector 30 is connected to the second port 24 of the fiber optic adapter 20 thereby positioning the ferrule 36 and the terminated end 34 within the ferrule receiver 26. The inspection probe 70 is inserted into the inspection probe holder 40 and the tip and probe assembly 13 is attached to the microscope 12. The plug portion 42 of the inspection probe holder 40 can engage the first port 22 to provide a mating mechanical interface between the components. Alignment and orientation of the inspection probe holder 40 and the fiber optic adapter 20 can be controlled and maintained by the features of the plug portion 42.

In preferred embodiments, the coupling feature 58 of the inspection probe holder 40 engages the locating surface 28 of the ferrule receiver 26 of the fiber optic adapter 20. The engaged coupling feature 58 and the locating surface 28 control the relative position between the first end 72 of the inspection probe 70 and the terminated end 34 of the optical fiber 32.

In certain embodiments, it is desired to align the axis A3 of the inspection probe 70 normal to the end face 37 of the ferrule 36. This can be accomplished by choosing the angle α of the inspection probe holder 40 to be complementary to the angle β of the end face 37 of the ferrule 36 (i.e., α+β=90 degrees) and by properly orienting the inspection probe holder 40 within the first port 22 of the fiber optic adapter 20. As discussed above, the plug portion 42 can engage the first port 22 to achieve proper orientation. The cutaway 59 can provide clearance between the inspection probe holder 40 and the fiber optic adapter 20 if necessary. By aligning the axis A3 of the inspection probe 70 normal to the end face 37 of the ferrule 36, the optical image of the end face 37 can be conveyed through the tip and probe assembly 13 to the microscope 12 along a generally straight path generally parallel to the axis A3. Therefore, the optical image of the end face 37 can be conveyed without the use of mirrors, optical fibers, or other such light bending, reflecting, or redirecting means. A central axis of the lens or lenses of the inspection probe can be aligned with the axis A3 and focus the optical image of the end face 37.

By inserting the fiber optic connector 30 and the inspection probe 70 into the fiber optic adapter 20, the first end 72 of the inspection probe 70 is proximate the terminated end 34 of the optical fiber 32 and the end face 37 of the ferrule 36. The inspection probe 70 can then gather images of and thereby inspect the terminated end 34 and the ferrule 36. To adjust focus of the inspection probe 70, the inspection probe 70 can be slid relative to the inspection probe holder 40 along the aligned axes A2, A3. The elastic element 60 compresses as the inspection probe 70 is inserted farther into the passage 41 of the inspection probe holder 40 and biases the inspection probe 70 outward. Thus, by pressing and releasing the inspection probe 70 within the inspection probe holder 40, the focus can be adjusted and controlled.

In the present disclosure, the term "generally parallel" includes items and variations that are approximately parallel and actually parallel. Likewise, the term "generally lies" includes items and variations that approximately lie and actually lie, and "generally rectangular" includes geometry that is approximately rectangular and actually rectangular.

From the forgoing detailed description, it will be evident that modifications and variations can be made in the devices of the disclosure without departing from the spirit or scope of the invention.

What is claimed is:

1. An inspection probe assembly for inspecting a fiber optic ferrule and/or an optical fiber within a fiber optic adapter, the inspection probe assembly comprising:

an inspection probe extending between a first end and a second end, the inspection probe including an outer surface; and an inspection probe holder extending between a first end and a second end, the first end of the inspection probe holder including a coupling feature, the inspection probe holder including a passage extending between the first and the second ends of the inspection probe holder, the passage including a first opening at the first end of the inspection probe holder and a second opening at the second end of the inspection probe holder;

wherein the fiber optic adapter defines a central longitudinal axis and houses the fiber optic ferrule, the fiber optic ferrule terminating the optical fiber at an end of the fiber optic ferrule, the end of the fiber optic ferrule being viewable via a first port of the fiber optic adapter when the fiber optic ferrule is inserted into the fiber optic adapter, the optical fiber being oriented generally parallel with the central longitudinal axis when the fiber optic ferrule is inserted into the fiber optic adapter;

wherein the inspection probe is insertable into the passage of the inspection probe holder along a direction of insertion and removable from the passage of the inspection probe holder along a direction opposite the direction of insertion, the outer surface of the inspection probe interfacing with the passage of the inspection probe holder; and wherein the inspection probe holder is insertable into and removable from the first port of the fiber optic adapter.

2. The inspection probe assembly of claim 1, wherein the first end of the inspection probe is inserted into the second opening of the passage of the inspection probe holder and the first end of the inspection probe holder is inserted into the first port of the fiber optic adapter.

3. The inspection probe assembly of claim 2, wherein the fiber optic adapter also houses at least a portion of a fiber optic connector, the fiber optic connector being insertable into and removable from a second port of the fiber optic adapter, the fiber optic ferrule being held by the fiber optic connector and being inserted and removed from the fiber optic adapter along with the fiber optic connector.

4. The inspection probe assembly of claim 3, wherein the fiber optic connector is inserted into the second port of the fiber optic adapter.

5. The inspection probe assembly of claim 4, wherein the fiber optic adapter includes a ferrule receiver accessible via the first and the second ports of the fiber optic adapter, the ferrule receiver including an interior ferrule holding surface and an outer locating surface, the interior ferrule holding surface radially holding and locating the fiber optic ferrule with respect to the central longitudinal axis of the fiber optic adapter while the outer locating surface also radially locates the coupling feature of the inspection probe holder with respect to the central longitudinal axis.

6. The inspection probe assembly of claim 5, wherein the fiber optic connector is an SC fiber optic connector.

7. The inspection probe assembly of claim 1, wherein the fiber optic adapter includes a ferrule receiver accessible via the first port and a second port of the fiber optic adapter, the ferrule receiver including an interior ferrule holding surface and an outer locating surface, the interior ferrule holding surface radially holding and locating the fiber optic ferrule with respect to the central longitudinal axis of the fiber optic adapter while the outer locating surface also radially locates the coupling feature of the inspection probe holder with respect to the central longitudinal axis.

8. The inspection probe assembly of claim 7, wherein the fiber optic adapter also houses at least a portion of an SC fiber optic connector, the SC fiber optic connector being insertable into and removable from a second port of the fiber optic adapter, the fiber optic ferrule being held by the SC fiber optic connector and being inserted and removed from the fiber optic adapter along with the SC fiber optic connector.

9. The inspection probe assembly of claim 1, wherein the end of the fiber optic ferrule is angled from the central longitudinal axis by an angle of about 82 degrees.

10. The inspection probe assembly of claim 1, wherein the passage of the inspection probe holder defines a inspection probe holder axis, the inspection probe holder axis being angled from the central longitudinal axis of the fiber optic adapter by an angle of about 8 degrees when the inspection probe holder is inserted into the fiber optic adapter.

11. A method of inspecting a ferrule and/or a terminated optical fiber within a fiber optic adapter, the method comprising:

providing a inspection probe, the inspection probe extending between a first end and a second end, the inspection probe including an outer surface;

providing a inspection probe holder, the inspection probe holder extending between a first end and a second end, the first end of the inspection probe holder including a coupling feature, the inspection probe holder including a passage extending between the first and the second ends of the inspection probe holder, the passage including a first opening at the first end of the inspection probe holder and a second opening at the second end of the inspection probe holder;

inserting the inspection probe into the passage of the inspection probe holder;

inserting the inspection probe holder into a first port of the fiber optic adapter; and engaging the coupling feature of the inspection probe holder with a ferrule receiver of the fiber optic adapter.

* * * * *